United States Patent [19]

Barnes et al.

[11] 4,300,892
[45] Nov. 17, 1981

[54] PLASTICS BAGS PRODUCTION

[75] Inventors: John G. Barnes, Brampton; Charles R. Murray, Toronto, both of Canada

[73] Assignee: Imperial Chemical Industries Limited, London, England

[21] Appl. No.: 76,440

[22] Filed: Sep. 17, 1979

Related U.S. Application Data

[63] Continuation of Ser. No. 778,926, Mar. 18, 1977, now Defensive Publication No. T966,002.

[30] Foreign Application Priority Data

Mar. 23, 1976 [GB] United Kingdom ............ 11632/76

[51] Int. Cl.³ .......................... B31B 1/66; B31B 1/84
[52] U.S. Cl. ................... 493/193; 156/290; 156/583.4; 493/209; 493/929; 493/230
[58] Field of Search ............ 93/35 R, 33 H, DIG. 1, 93/8 VB; 156/290, 583.4; 428/195; 493/193–198, 230, 209, 203, 213, 929, 933

[56] References Cited

U.S. PATENT DOCUMENTS 2,320,326  5/1943  Avery ................. 93/33 H
3,135,077  6/1964  Siegel et al. ............ 53/568
3,552,278  1/1971  Guenther ............. 93/35 R
3,812,769  5/1974  Barnes et al. ............ 93/35 R
3,983,794  10/1976  Buchner ............. 93/DIG. 1 X Primary Examiner—James F. Coan
Attorney, Agent, or Firm—Cushman, Darby & Cushman

[57] ABSTRACT

In the production of plastics bags, especially valved bags, from a web of plastics material by folding in the side margins of the web to form overlapping panels which are then longitudinally heat-sealed together for a major portion of one bag length, and then heat-sealing the web transversely and severing the web at intervals to produce individual bags, the two overlapping panels are heat-sealed together by forming two longitudinal seals which partially overlap to provide a forward longitudinal seal and a rear longitudinal seal with respect to the direction of travel of the web, the rear longitudinal seal of each bag being formed simultaneously with the forward longitudinal seal of the adjacent following bag. The apparatus comprises a pair of heat-sealing elements equipped for simultaneous operation and arranged for forming the rear seal in one bag and the forward seal in the following adjacent bag. The two elements may be a fixed distance apart, and at least one has suitably a hair-pin shape.

7 Claims, 11 Drawing Figures

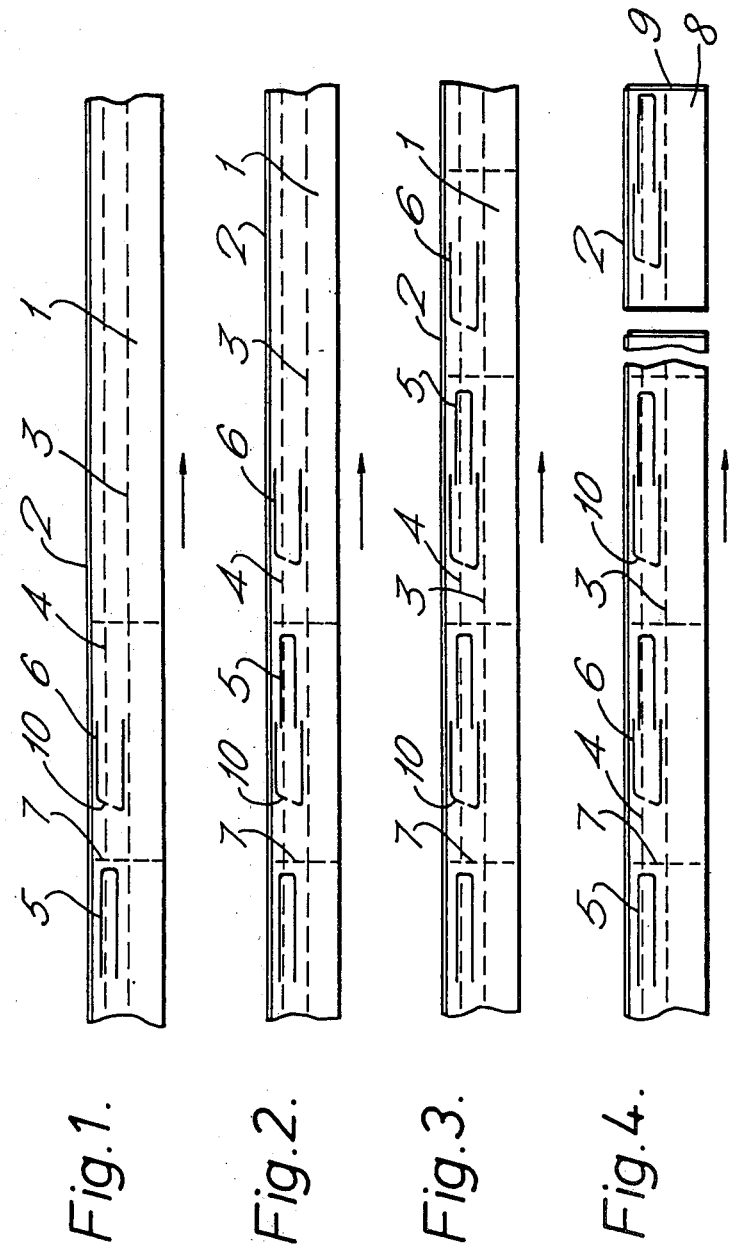

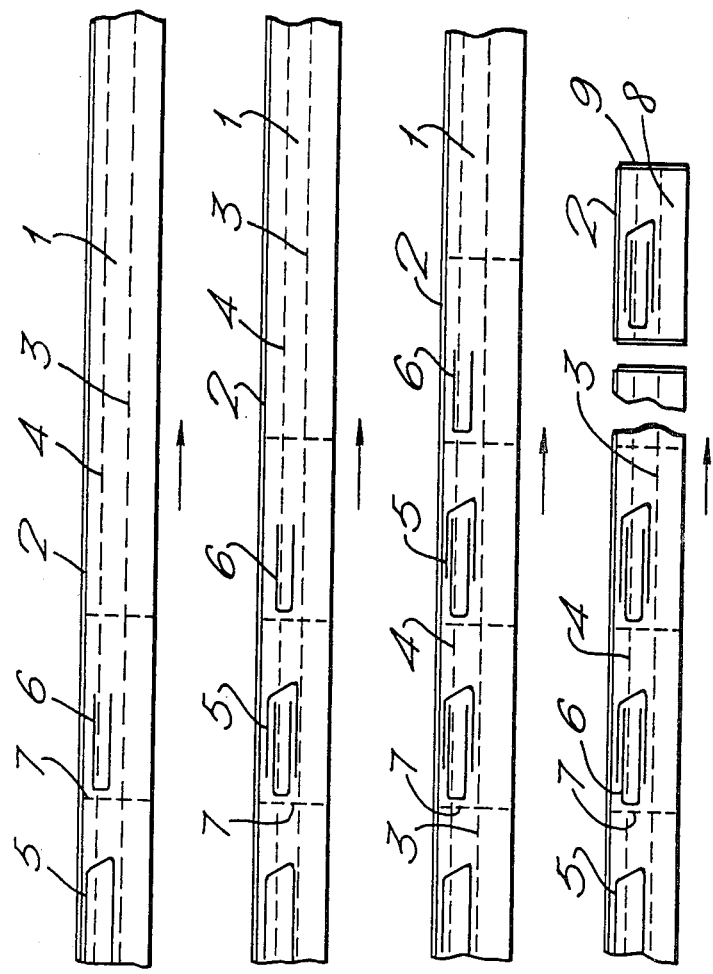

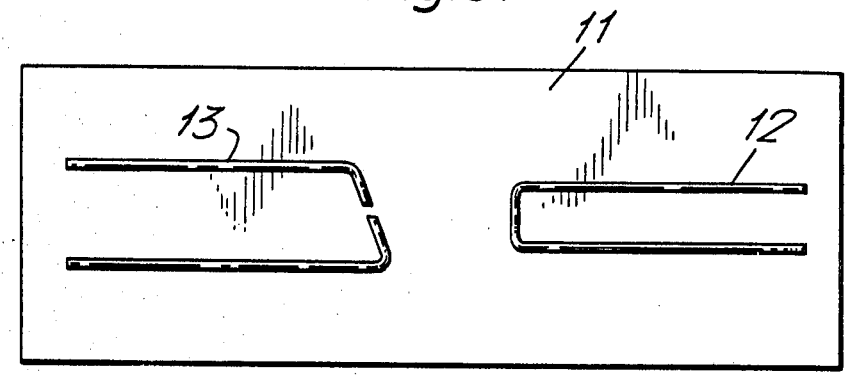
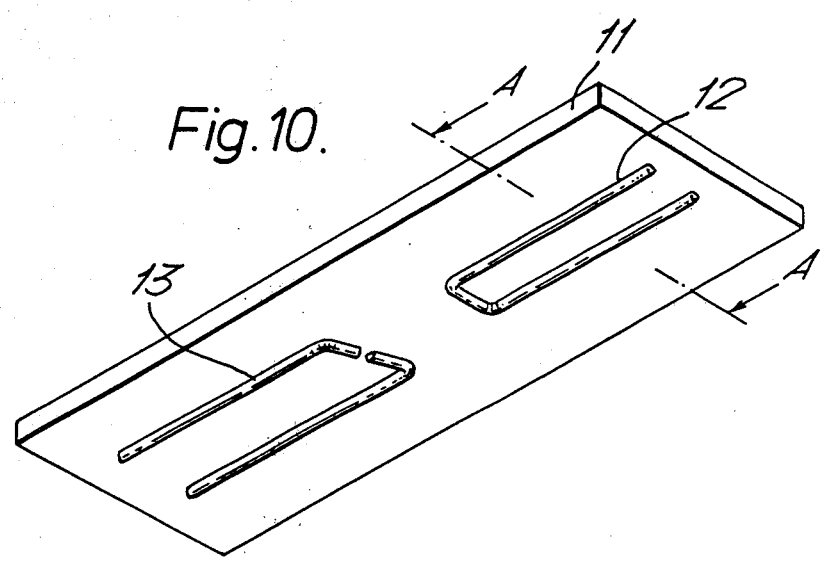
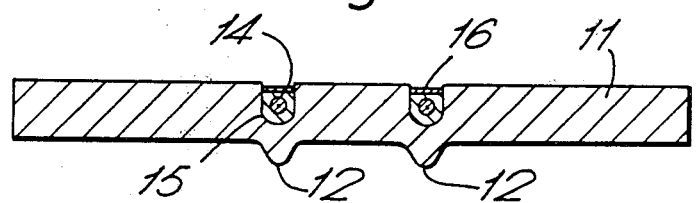

PLASTICS BAGS PRODUCTION

This is a continuation of application Ser. No. 778,926 filed Mar. 18, 1977, now Defensive Publication No. T966,002 issued Jan. 3, 1978.

This invention relates to the production of plastics bags.

The invention relates more particularly to the production of plastics bags of a construction comprising a rectangular sheet of, for examle, polyethylene film, having opposite side edges folded in to form overlapping panels which are longitudinally sealed together along at least a major portion of their length. Generally both ends of the bag are sealed and a portion of the overlap is left unsealed to provide a filling valve between the overlapping panels, usually adjacent to an end of the bag. Alternatively, the overlapping panels may be sealed together along their whole length, and one end of the bag left open for filling. In either case the bags may be made continuously from a folded web of the plastics material, the bag units being defined by transversely sealing the folded web and the individual bags produced by severing the web. Such a method is described in U.S. Pat. No. 3 812 769.

A two-ply valved bag of such construction is described and claimed in United Kingdom Specification No. 1 367 001.

In the commercial production of plastics bags it is desirable to be able to manufacture bags of different lengths on the same line. For bags made from tubular film having no longitudinal seams, this may be achieved easily by simply adjusting the incremental advancement of the web between successive operations of forming the transverse seals. However, when making bags with longitudinal seals, such seals must vary in length with variations in the length of each bag unit, each different bag length requiring its own corresponding length of longitudinal seal. Nevertheless, to have to provide a range of different sealing dies and to replace these with every change in bag length is inconvenient, time-consuming and expensive.

We have now found that we can avoid having to replace the die for each change in bag length by forming the longitudinal seal of each bag unit as two longitudinal heat-seals partially overlapping one another longitudinally, the amount of overlap being varied to give such variation in length of longitudinal seal as may be required by variation in bag length. We have also found a particularly effective method of making such longitudinal seals.

According to one aspect of the present invention, an improvement is provided in the method for producing plastics bags from a web of plastics material which comprises folding in the side margins of the web to form overlapping panels, repetitively advancing the web by predetermined increments of one bag unit length, longitudinally heat-sealing the overlapping panels together for a length of at least a major portion of one bag unit, heat-sealing the web transversely and at least partially severing the web to define individual bag units; the improvement consisting in heat-sealing together the two overlapping panels of each bag unit by forming two longitudinal seals which partially overlap to provide a forward longitudinal seal and a rear longitudinal seal with respect to the direction of travel of the web, the rear longitudinal seal of each bag unit being formed simultaneously with the forward longitudinal seal of the adjacent following bag unit.

The separation between the rear longitudinal seal of each bag unit and the forward longitudinal seal of the adjacent following bag unit, which is required for making bags with a valve at one end, will be greater than that required for making open-mouthed bags. However, provided the bags produced are all of the same kind, e.g. they are all open-mouthed bags or they all have a similar valve at one end, the separation may remain constant despite changes in bag length. All changes in bag length will then automatically result in corresponding changes in the overlap between the two longitudinal seals of each bag unit, and hence in the length of the overall combined longitudinal seal.

According to a further aspect of the invention, in apparatus for producing plastics bags from a web of plastics material and comprising means for providing a single or multi-ply web of plastics film, means for advancing the web, means for folding-in the side margins of the web into overlapping relationship, means for longitudinally sealing together the overlapped margins, and means for transversely sealing and at least partially severing the web at predetermined intervals to define individual bags; the improvement consisting in that the means for longitudinally sealing together the overlapped margins comprises a pair of heat-sealing elements equipped for simultaneous operation and comprising a heat-sealing element for forming the rear seal in one bag unit and a heat-sealing element for forming the forward seal in the following adjacent bag unit, the two elements being fixed in longitudinal spaced-apart relationship one to the other with their adjacent ends corresponding to the spaced-apart ends of the seals of the bag units.

The two heat-sealing elements are preferably fixed to a common platen. In the construction of valved bags, it is preferred that the overlapping portions of the web be transversely sealed together at the valve, at the end of the longitudinal seal, so that a valve sleeve is formed between this transverse seal and the end seal of the bag. It is also preferred in such bags that the overlapping portions be longitudinally sealed together along both margins thereof. It is thus convenient to form at least one and preferably both of the longitudinal seals in substantially hairpin shape, one seal being inverted with respect to the other and the seals being arranged so that the hairpin bend of one of them provides a transverse seal adjacent to the valve, while the bend of the other faces the other end of the bag. The two hairpin seals are preferably arranged either so that the straight ends of one lie between those of the other, or so that the straight ends alternate with one another. The hairpin bend of the sealing profile bordering the valve may be at an angle other than perpendicular to the longitudinal seal such as to form a valve with a tapered entrance, for use in conjunction with a tapered filling nozzle. It is also desirable to provide an interruption in the hairpin bends of the sealing profiles, so that air may escape through the seal and any problem that might arise through the trapping of air in the sealed web, for example in passing the web between nip rollers downstream of the heat-sealing position, may be avoided.

The invention will now be further described by way of example with reference to the accompanying drawings, of which:

FIGS. 1 to 4 show, diagrammatically, steps in the production of valved bags of greater length;

FIGS. 5 to 8 show, again diagrammatically, steps in the production of valved bags of shorter length, and with the two hairpin seals formed in reverse positions;

FIG. 9 is a view of the lower face of a sealing platen for forming the two seals of FIGS. 5 to 8;

FIG. 10 is a perspective view of the platen; and

FIG. 11 is a section through A—A of FIG. 10.

In FIGS. 1 to 8: 1 is a folded web formed from a length of flattened tubular film of plastics material, for example of low-density polyethylene, by slitting the film longitudinally along a line spaced somewhat from one edge-fold, opening out this fold, and folding-in the oppposite sides of the resulting two-ply web so that the margin edged by the remaining edge fold 2 of the tubular film overlaps the margins of both the slit layers, the edges of these being shown at 3 and 4. The web 1 is advanced intermittently in increments of one bag length, in the direction indicated. At 5 is shown the forward longitudinal heat-seal for one bag unit, and at 6 the rear longitudinal heat-seal for the adjacent preceding bag unit. The broken line 7 indicates the ultimate position of the transverse heat-sealing and severing of the bag units to produce individual, finished bags 8 heat-sealed across each end, as at 9, with a filling valve being thereby formed between an end seal 9 and the wider of the two longitudinal seals, i.e. the rear seal of FIGS. 1 to 4 and the forward seal of FIGS. 5 to 8. A narrow gap 10 is provided in the end of the rear longitudinal seal 6 of FIGS. 1 to 4 to permit escape of air from the confines of the seal. This is not essential to the operation of the bag or its valve once completed, but where the bag is fed through nip rolls after formation of the seal, it is advisable to provide means for releasing any air trapped by the rear seal. Alternative means for releasing trapped air include perforations in the film.

In FIGS. 9 to 11: 11 is a support block, suitably of mild steel or aluminium, having on its lower surface integral raised lands providing sealing profiles, 12 and 13, for forming the two longitudinal seals in the production of valved bags, the hairpin bend of the sealing profile 13 being angled so that in each bag, a tapered filling valve will be provided between the hairpin seal thus formed and its adjacent end seal. In FIG. 11, 14 indicates a heater element accommodated in a groove 15 machined in the support block, and held in the groove by a retaining strip 16.

By comparison of FIGS. 1 to 4 with FIGS. 5 to 8, it will be seen that when the length of the bags is adjusted by adjusting the length of the increment by which the web is moved between successive longitudinal sealing steps, the length of the combined longitudinal seals is automatically adjusted also. The width of the filling valve can also be adjusted, by adjusting the position of transverse heat-sealing in the space between the ends of the longitudinal heat-seals of adjacent bags. The method of the invention thus provides much flexibility for the production of bags of various sizes.

We claim:

1. In a method for producing plastics bags from a web of plastics material which comprises folding in the side margins of the web to form overlapping panels, repetitively advancing the web by predetermined increments of one bag unit length, longitudinally heat-sealing the overlapping panels together for a length of at least a major portion of one bag unit, heat-sealing the web transversely and at least partially severing the web to define individual bag units;

the improvement consisting in heat-sealing together the two overlapping panels of each bag unit by forming two longitudinal seals which partially overlap to provide a forward longitudinal seal and a rear longitudinal seal with respect to the direction of travel of the web, at least one of said longitudinal seals is substantially hairpin in shape, said seal being interrupted in the hairpin bend whereby any air which may be enclosed in the bend may escape, the hairpin shape providing a transverse seal adjacent to the valve, and the rear longitudinal seal of each bag unit being formed simultaneously with the forward longitudinal seal of the adjacent following bag unit.

2. A method according to claim 1 wherein the two longitudinal seals formed simultaneously in adjacent bag units are spaced-apart and a transverse end seal made between them in a position sufficiently far from one of the two longitudinal seals to provide a filling valve between that one seal and the transverse seal.

3. A method according to claim 1 or 2 wherein the web is a multi-ply web of plastics film.

4. In an apparatus for producing plastics bags from a web of plastics material comprising means for providing a single or multi-ply web of plastics film, means for advancing the web, means for folding-in the side margins of the web into overlapping relationship, means for longitudinally sealing together the overlapped margins, and means for transversely sealing and at least partially severing the web at predetermined intervals to define individual bags;

the improvement consisting in that the means for longitudinally sealing together the overlapped margins comprises a pair of heat-sealing elements equipped for simultaneous operation and comprising a heat-sealing element for forming the rear seal in one bag unit, and a heat-sealing element for forming the forward seal in the following adjacent bag unit, at least one of the longitudinal sealing elements being substantially hairpin in shape and having an interruption in the hairpin bend therein, the two elements being fixed in longitudinal spaced-apart relationship one to the other with their adjacent ends corresponding to the spaced-apart ends of the seals of the bag units.

5. Apparatus according to claim 4 wherein the two heat-sealing elements are fixed to a common platen.

6. In a method for producing plastics bags from a web of plastics material which comprises folding in the side margins of the web to form overlapping panels, repetitively advancing the web by predetermined increments of one bag unit length, longitudinally heat-sealing the overlapping panels together for a length of at least a major portion of one bag unit, heat-sealing the web transversely and at least partially severing the web to define individual bag units;

the improvement consisting in heat-sealing together the two overlapping panels of each bag unit by forming two longitudinal seals which partially overlap to provide a forward longitudinal seal and a rear longitudinal seal with respect to the direction of travel of the web, the rear longitudinal seal of each bag unit being formed simultaneously with the forward longitudinal seal of the adjacent following bag unit, wherein at least one of the longitudinal seals is substantially hairpin shape, and interrupted in the hairpin bend whereby any air which may become enclosed within the hairpin bend may escape.

7. In an apparatus for producing plastics bags from a web of plastics material comprising means for providing a single or multi-ply web of plastics film, means for advancing the web, means for folding-in the side margins of the web into overlapping relationship, means for longitudinally sealing together the overlapped margins, and means for transversely sealing and at least partially severing the web at predetermined intervals to define individual bags;

the improvement wherein the means for longitudinally sealing together the overlapped margins comprises a pair of heat-sealing elements fixed to a common platen equipped for simultaneous operation and comprise a heat-sealing element for forming the rear seal in one bag unit, and a heat-sealing element for forming the forward seal in the following adjacent bag unit, at least one of the longitudinal sealing elements is of a substantially hairpin shape and an interruption is provided in the hairpin bend of said element;

the two elements being fixed in longitudinal spaced-apart relationship one to the other with their adjacent ends corresponding to the spaced-apart ends of the seals of the bag units.

* * * * *